United States Patent [19]
Nichols et al.

[11] Patent Number: 5,458,394
[45] Date of Patent: Oct. 17, 1995

[54] TRAY ASSEMBLY FOR CHILD'S SEAT

[75] Inventors: Khipra J. Nichols, Rumford; Lisa M. Perrine, Pawtucket, both of R.I.

[73] Assignee: Hasbro, Inc., Pawtucket, R.I.

[21] Appl. No.: 136,963

[22] Filed: Oct. 14, 1993

[51] Int. Cl.$^6$ ................................................ A47B 83/02
[52] U.S. Cl. .................................... 297/173; 297/153
[58] Field of Search ........................... 297/148–151, 297/153–155, 173, 189, 194, 135, 250.1, 256.15, 184.13; 108/43–45

[56] References Cited

U.S. PATENT DOCUMENTS

| | | | |
|---|---|---|---|
| D. 305,522 | 1/1990 | Kohus et al. | D12/133 |
| D. 316,238 | 4/1991 | Giambrone | D12/133 |
| 1,256,936 | 2/1918 | Shaver . | |
| 1,882,264 | 10/1932 | Thompson | 297/149 |
| 3,143,374 | 8/1964 | Carboni | 297/153 X |
| 3,330,597 | 7/1967 | Lay et al. | 297/148 |
| 3,369,839 | 2/1968 | Telarico | 297/150 |
| 3,515,429 | 6/1970 | Bollinger . | |
| 4,512,503 | 4/1985 | Gioso | 297/194 X |
| 4,512,607 | 4/1985 | Rapp | 297/153 |
| 4,659,099 | 4/1987 | Malone | 108/44 X |
| 4,718,717 | 1/1988 | Cruz | 297/153 X |
| 4,770,107 | 9/1988 | Miller | 297/135 X |
| 4,795,209 | 1/1989 | Quinlan, Jr. et al. | 297/153 |
| 4,856,809 | 8/1989 | Kohus et al. | 280/644 |
| 4,946,180 | 8/1990 | Baer | 280/39 |
| 4,968,092 | 11/1990 | Giambrone | 297/151 |
| 5,106,156 | 4/1992 | Marquis | 297/148 X |

FOREIGN PATENT DOCUMENTS 2177907  2/1987  United Kingdom ............ 297/135

Primary Examiner—Kenneth J. Dorner
Assistant Examiner—Milton Nelson, Jr.
Attorney, Agent, or Firm—Kurt R. Benson

[57] ABSTRACT

A tray assembly for a seat for a young child includes a tray portion, a pair of side arm portions which are adjustably positionable in a plurality of different outwardly extended positions and a pair of strap assemblies on the front portion of the tray portion. The tray assembly is adapted to be removably received on a seat, such as a stroller, so that it is supported on a retaining bar portion of the seat and so that the strap assemblies encircle the retaining bar in a manner which permits the tray assembly to be pivoted forwardly to an out-of-the-way position on the seat.

15 Claims, 3 Drawing Sheets

TRAY ASSEMBLY FOR CHILD'S SEAT

BACKGROUND AND SUMMARY OF THE INVENTION

The instant invention relates to juvenile furniture and more particularly to a tray assembly for a seat for young child.

A variety of different types of seats, including high chairs and strollers, have been heretofore available for supporting young children. Further, many of the heretofore available seats have included feeding trays which are either permanently or removably attached thereto. However, in most instances the feeding trays which have been heretofore available for use in combination with seats for young children have not been effectively adapted to be readily and easily removed from seats to which they are attached. They have also not been adapted to be readily and easily moved to out-of-the-way positions on seats to facilitate the positioning of young children in or the removal thereof from seats. Still further, the heretofore available removable trays have, for the most part, not been adapted for use in combination with seats of various different widths.

The instant invention provides an effective tray assembly for use in combination with a seat, such as a stroller for a young child. More specifically, the instant invention provides a tray assembly which is adapted for use in combination with a seat comprising a seat portion for receiving a child therein and a retaining bar for retaining the child in the seat portion, wherein the retaining bar includes a pair of opposite side portions which extend forwardly along opposite sides of the seat portion and a front portion which extends between the side portions. The tray assembly of the instant invention comprises a tray portion and support means for supporting the tray portion on the opposite side portions of the retaining bar. The tray assembly further comprises attachment means for securing the tray portion to the front portion of the retaining bar. The attachment means is constructed so that it encircles the front portion of the retaining bar in a manner which permits the tray portion to be pivoted forwardly about the retaining bar for facilitating the assembly of a child in or the removal of the child from the seat portion. The means for attaching the tray portion to the front portion of the retaining bar is preferably constructed so that it releasably encircles the front portion of the retaining bar, and it preferably includes at least one releasable strap for encircling the front portion. The means for supporting the tray assembly on the retaining bar is preferably adjustable for supporting the tray assembly on retaining bars of different widths and heights. The means for supporting the tray portion preferably comprises a pair of support arms which extend outwardly from opposite sides of the tray portion. Further, the support arms are preferably adjustably secured to the tray portion, and they are preferably adjustably positionable in a plurality of different outwardly extended positions relative thereto. Each of the support arms preferably includes an outwardly extending main portion and a downwardly extending end portion on the outer extremity of the main portion thereof, and each of the support arms is preferably adjustably securable in a plurality of different outwardly extended positions.

It has been found that the tray assembly of the instant invention can be effectively utilized in combination with a seat for a young child, such as a stroller, in order to provide a convenient feeding tray on the seat. Specifically, it has been found that because the tray includes a pair of adjustably positionable support arms, it can be effectively utilized in combination with seats having retaining bars of various widths and heights. Further, because the tray is adapted to be secured to the front portion of a retaining bar in a manner which permits the tray to be pivoted forwardly relative to the front portion, the tray assembly can be readily moved to facilitate the assembly of a child in the chair or the removal of the child therefrom.

Accordingly, it is a primary object of the instant invention to provide an effective tray assembly for use in combination with a seat for a young child, such as a stroller.

Another object of the instant invention is to provide an effective tray assembly for a seat for a young child which is adapted to be readily moved to an out-of-the-way position for assembling a child in the seat or for removing the child therefrom.

An even still further object of the instant invention is to provide a tray assembly for a seat for a young child which is adjustable for use in combination with chairs having retaining bars of various widths.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention.

DESCRIPTION OF THE INVENTION

Figure 1:
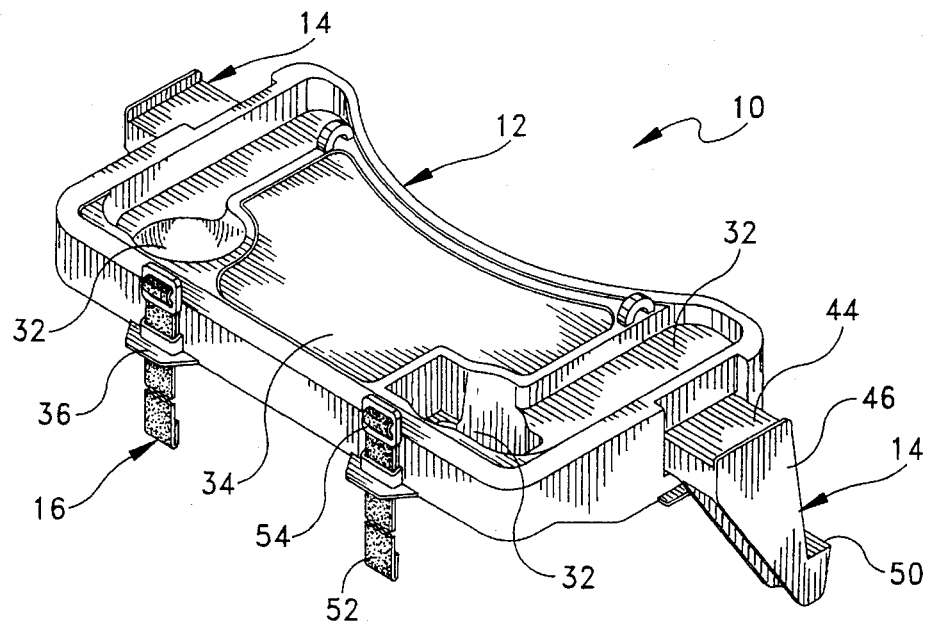
FIG. 1 is a perspective view of the tray assembly of the instant invention with the support arms in the retracted positions thereof.
Figure 2:
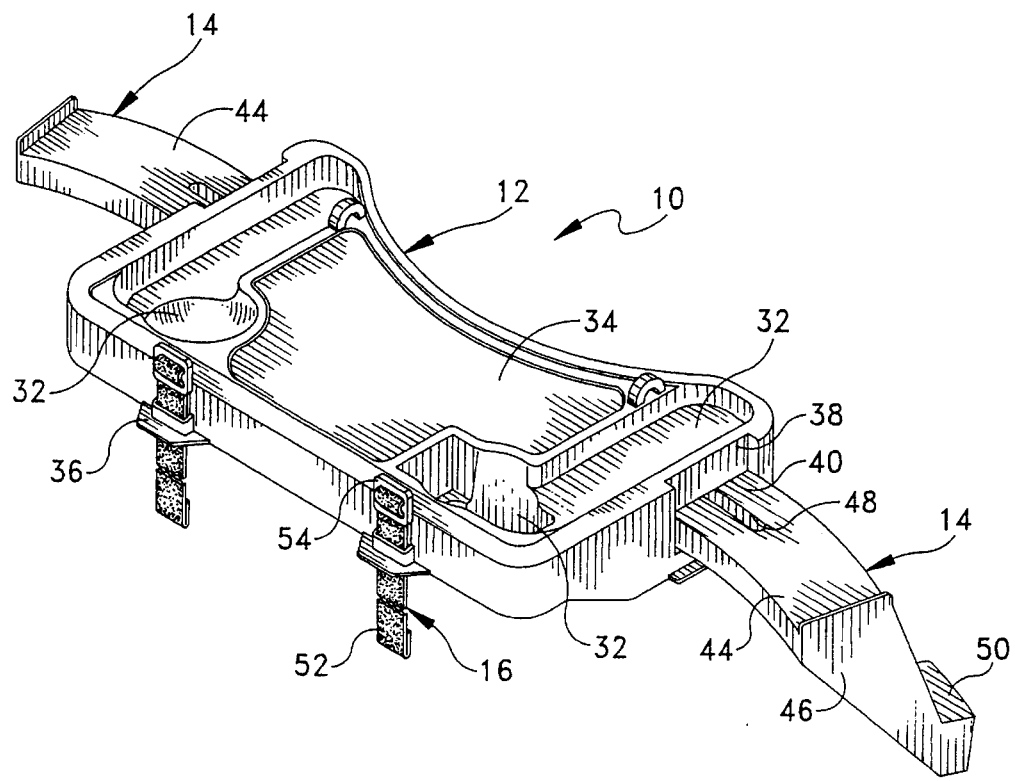
FIG. 2 is a perspective view thereof with the support arms in the outwardly extended positions thereof.
Figure 3:
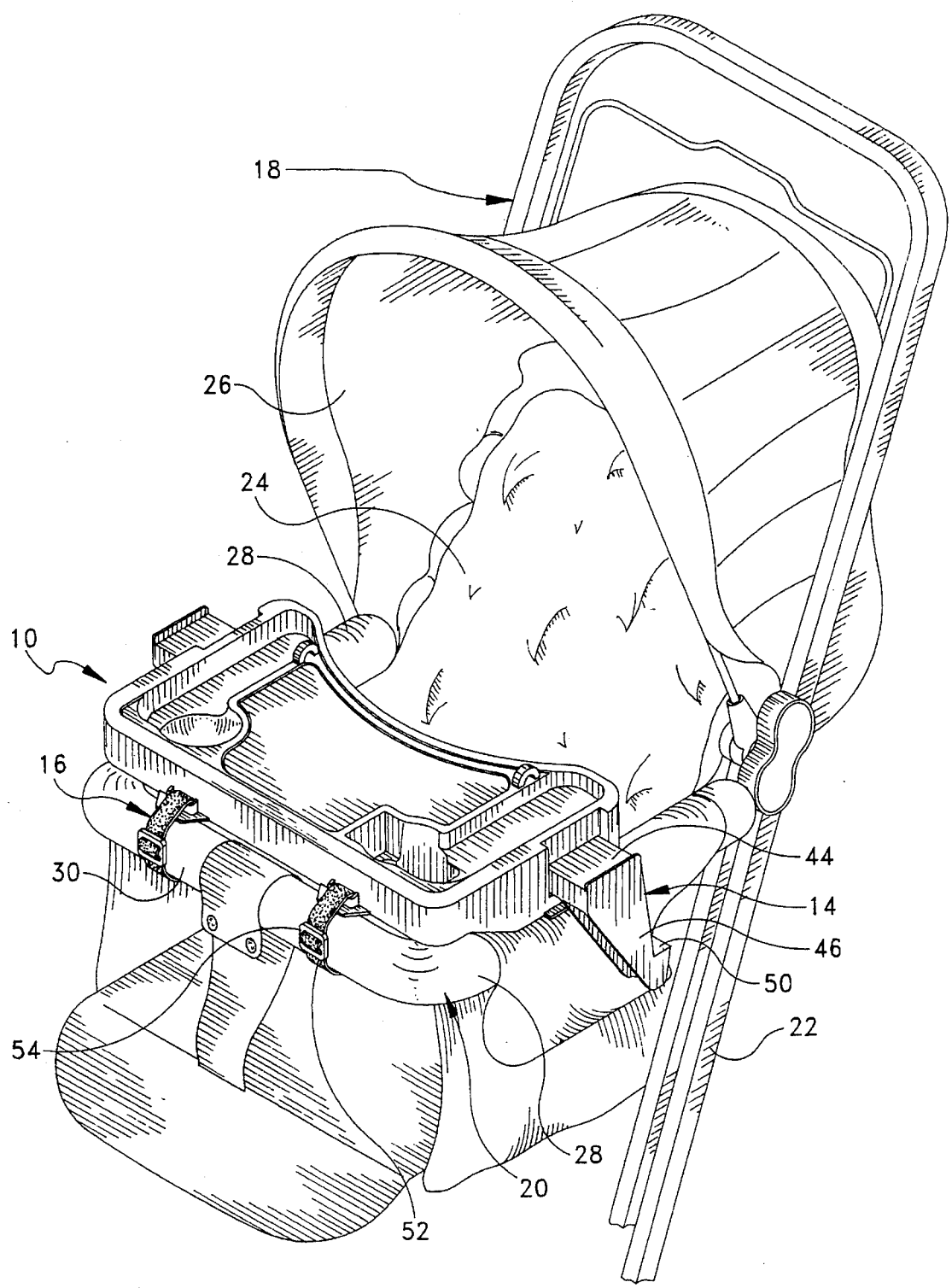
FIG. 3 is a perspective view of the tray assembly as received on a stroller.
Figure 4:
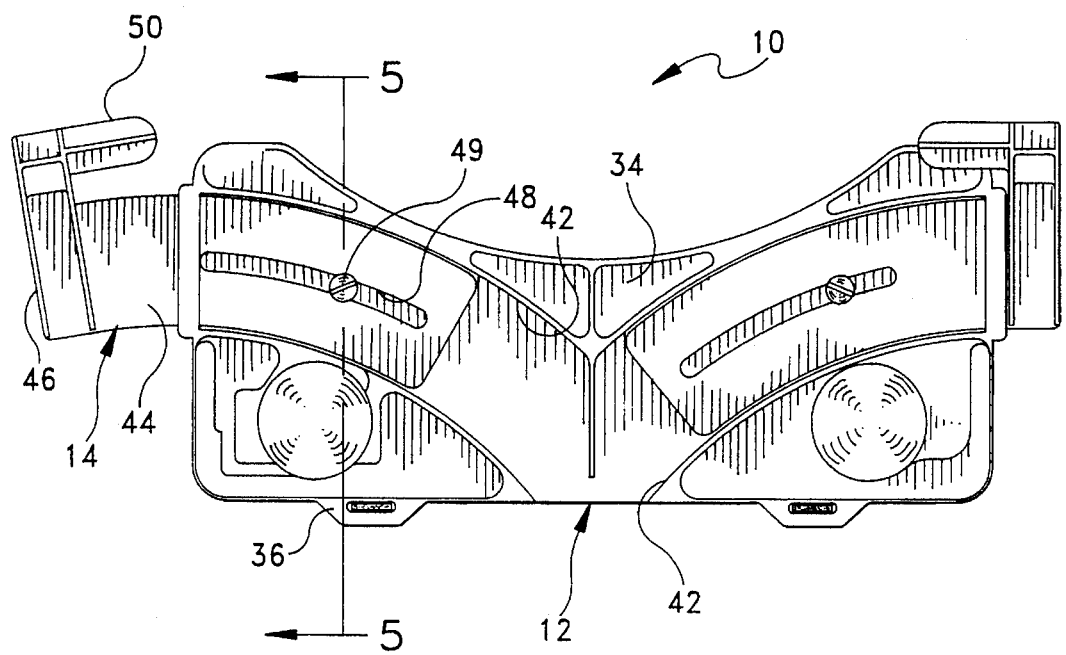
FIG. 4 is a bottom plan view of the tray assembly.

Referring now to the drawings, the tray assembly of the instant invention is illustrated in FIGS. 1 through 5 and generally indicated at 10 in FIGS. 1 through 4. The tray assembly 10 comprises a tray portion generally indicated at 12, a pair of retaining arms which are each generally indicated at 14 and a pair of strap assemblies which are each generally indicated at 16. As illustrated in FIG. 3, the tray assembly 10 is adapted for use in combination with a chair or seat for a young child generally indicated at 18 in order to provide a convenient, yet removable, feeding tray accessory for the seat 18. In this regard, the seat 18 includes a retaining bar generally indicated at 20 for retaining a young child therein, and the tray assembly 10 is adapted to be received and supported on the retaining bar 20 in the manner illustrated in FIG. 3. The seat 18, as herein embodied, comprises an infant's stroller which includes casters or wheel assemblies which are adapted for movably supporting the seat 18 on a supporting surface.

The seat 18 comprises a conventional frame portion 22, a seat portion 24 and a hood or canopy portion 26. As illustrated, the seat portion 24 is supported on the frame portion 22 in a conventional manner and the hood portion 26 is pivotally attached to the seat portion 24 and adapted to provide a sun shade for a young child seated in the seat portion 24. The retaining bar 20 is attached to the frame portion 22 so that it extends forwardly along opposite sides of the seat portion 24 and then across the front of the seat 18 for effectively retaining a child in the seat portion 24. Accordingly, the retaining bar 20 includes a pair of forwardly extending side portions 28 and a front portion 30 which extends between the side portions 28 adjacent the front end of the seat 18.

Figure 5:
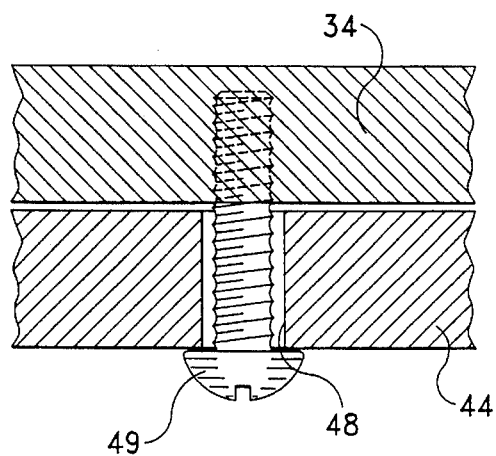
FIG. 5 is a sectional view taken along line 5—5 in FIG. 4.

Referring now more specifically to the tray assembly 10, the tray portion 12 is preferably integrally molded from a suitable plastic material so that it includes a plurality of recessed areas 32 for receiving and positioning various articles, such as a feeding bottle, various eating utensils and toys. The tray portion 12 further comprises a center tray area 34 which provides a convenient table surface which is disposed in front of a child received in seat portion 24 when the tray assembly 10 is received on the seat 18. The tray portion 12 further comprises a pair of integrally formed loop elements 36 which are adapted for receiving and securing the strap assemblies 16 to the tray portion 12. The tray portion 12 further includes a pair of opposite side recessed areas 38 having substantially rectangular openings or slots 40 formed therein through which the retaining arms 14 extend. As illustrated in FIG. 5, the underside of the tray portion 12 includes a pair of arcuate trackways or channels 42 which extend inwardly from the slots 40 for guiding the retaining arms 14 as they are retracted into the tray assembly 10 through the slots 40.

The retaining arms 14 each comprise an elongated arcuate arm portion 44 and a downwardly extending retaining portion 46 on the outer extremity of the arm portion 44 thereof. Each of the arm portions 44 has an arcuate slot 48 formed therein, and a screw 49 is slidably received in each of the slots 48 and received in threaded engagement with the underside of the tray portion 12 for slidably retaining each of the arm portions 14 in the respective channel 42 thereof. However, by tightening the screws 49 the retaining arms 14 can be releasably secured in position relative to the tray portion 12. Each of the retaining arms 14 further comprises an inwardly extending portion 50 on the retaining portion 46 thereof which is positioned in downwardly spaced relation to the tray portion 12. Accordingly, when the tray assembly 10 is received on a retaining bar 20, the inwardly extending portions 50 can be positioned so that they extend beneath the side portion 28 of the retaining bar 20 to more effectively retain the tray assembly 10 on the retaining bar 20.

The strap assemblies 16 comprise conventional strap assemblies which each include a strap portion 52 and a buckle element 54. The strap assemblies 16 are assembled through the loop elements 36 along the front edge of the tray portion 12 so that the strap assemblies 16 can be assembled in encircling relation around the front portion 30 of a retaining bar 20 in the manner illustrated in FIG. 3. Accordingly, the strap assemblies 16 are operative for releasably securing the tray assembly 12 to the retaining bar 20 in a manner which permits the tray assembly 12 to be pivoted forwardly about the front portion 30 so that a young child can be more easily positioned in or removed from the seat portion 24.

Accordingly, for use and operation of the tray assembly 10 in combination with a seat 18 the strap assemblies 16 are assembled with the front portion 30 of the retaining bar 20, and the tray assembly 10 is positioned so that it is supported on the retaining bar 20 with either the tray portion 12 or the arm portions 14 resting on the side portions 28 of the retaining bar 20. The arm portions 14 are adjusted in the manner illustrated in FIG. 3 so that they engage the sides of the side portions 28 and so that the inwardly extending portions 50 pass beneath the side portions 28 to further retain the tray assembly 10 on the retaining bar 20. Thereafter, the screws 49 can be tightened to more permanently secure the tray assembly 10 to the retaining bar 20, or the screws 49 can be left in their initial untightened positions so that the arm portions 14 can be more readily moved to further outwardly extended positions for pivoting the tray assembly 10 on the retaining bar 20. In any event, once the tray assembly 10 has been assembled on the retaining bar 20 it provides an effective feeding platform or table for use in feeding a young child received in the seat portion 24 as well as an effective playing surface.

It is seen therefore that the instant invention provides an effective tray assembly for use in combination with an infant's seat, such as a stroller or a high chair. The tray assembly 10 is adapted to be readily and easily assembled on the retaining bar 20 so that it provides an effective removable feeding platform or playing surface for an infant received in the seat portion 24. Further, the tray assembly 10 is adapted so that it can be effectively pivoted forwardly about the front portion 30 of the retaining bar 20, and because the arm portions 14 are adjustable to various outwardly extended positions, the tray assembly 10 is adapted for use in combination with seats having retaining bars 20 of various widths and heights. Hence, it is seen that the instant invention provides an effective and versatile feeding tray assembly which represents a significant improvement in the related art.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A tray assembly for a seat for a young child, wherein the seat is of a type which includes a seat portion for receiving the child therein and a retaining bar for retaining the child in the seat portion, and wherein the retaining bar is of a type which includes a pair of opposite side portions which extend forwardly along opposite sides of the seat portion and a front portion which extends between the side portions, said tray assembly comprising:

a. a tray portion having opposite sides;

b. support means for supporting said tray portion on the side portions of the retaining bar said support means comprising a pair of support arms, one of said support arms extending outwardly from each side of said tray portion, said support arms being adjustable for supporting said tray assembly on retaining bars of different widths; and c. attachment means for securing said tray portion to the front portion of the retaining bar, said attachment means being operative for encircling the front portion of the retaining bar in a manner permitting said tray portion to be pivoted forwardly about the front portion of the retaining bar for facilitating removal of the child from the seat portion.

2. In the tray assembly of claim 1, said tray portion having opposite sides, said support means comprising a pair of support arms, one of said support arms extending outwardly from each side of said tray portion.

3. In the tray assembly of claim 1, said support arms being adjustably secured to said tray portion and being adjustably positionable in a plurality of different outwardly extended positions relative thereto.

4. In the tray assembly of claim 1, each of said support arms including an outwardly extending main portion and an end portion extending downwardly from the main portion thereof for laterally retaining said tray portion in position on the retaining bar.

5. In the tray assembly of claim 1, said support arms being adjustably securable in a plurality of different outwardly extended positions.

6. In the tray assembly of claim 1, said attachment means being operative for releasably encircling the front portion of the retaining bar.

7. In the tray assembly of claim 6, said attachment means comprising at least one releasable strap for encircling the front portion of the retaining bar.

8. A seat and tray assembly for a young child comprising:
   a. a seat including a seat portion for receiving said child therein and a retaining bar for retaining said child in said seat portion, said retaining bar including a pair of opposite side portions which extend forwardly along opposite sides of said seat portion and a front portion which extends between said side portions; and
   b. a tray assembly including a tray portion, support means for supporting said tray portion on the side portions of said retaining bar, and attachment means for securing said tray portion to the front portion of said retaining bar, said attachment means encircling the front portion of said retaining bar in a manner permitting said tray portion to be pivoted forwardly thereabout for facilitating removal of said child from said seat portion.

9. In the seat and tray assembly of claim 8, said attachment means releasably encircling the front portion of said retaining bar.

10. In the seat and tray assembly of claim 9, said attachment means comprising at least one releasable strap encircling the front portion of said retaining bar.

11. In the seat and tray assembly of claim 8, said tray portion having opposite sides, said support means comprising a pair of support arms, one of said support arms extending outwardly from each side of said tray portion.

12. In the seat and tray assembly of claim 11, said support arms being adjustable for supporting said tray assembly on retaining bars of different widths.

13. In the seat and tray assembly of claim 12, said support arms being adjustably secured to said tray portion and being adjustably positionable in a plurality of different outwardly extended positions relative thereto.

14. In the seat and tray assembly of claim 13, each of said support arms including an outwardly extending main portion and an end portion extending downwardly from the main portion thereof for laterally retaining said tray portion in position on said retaining bar.

15. In the seat and tray assembly of claim 13, said support arms being adjustably securable in a plurality of different outwardly extended positions.

* * * * *